United States Patent
Fano et al.

(10) Patent No.: US 7,133,663 B2
(45) Date of Patent: Nov. 7, 2006

(54) DETERMINING THE CONTEXT OF SURROUNDINGS

(75) Inventors: Andrew E. Fano, Lincolnshire, IL (US); Scott W. Kurth, Wheeling, IL (US)

(73) Assignee: Accenture Global Services, GmbH, Schaffhausen (CH)

( * ) Notice: Subject to any disclaimer, the term of this patent is extended or adjusted under 35 U.S.C. 154(b) by 171 days.

(21) Appl. No.: 10/027,188

(22) Filed: Dec. 20, 2001

(65) Prior Publication Data

US 2003/0119446 A1   Jun. 26, 2003

(51) Int. Cl.
  *H04Q 7/22*   (2006.01)
  *H04M 3/42*   (2006.01)
  *H04B 7/00*   (2006.01)

(52) U.S. Cl. .............. 455/414.1; 455/414.2; 455/414.3; 455/414.4; 455/41.2; 455/456.1

(58) Field of Classification Search ............. None
See application file for complete search history.

(56) References Cited

U.S. PATENT DOCUMENTS

| | | | |
|---|---|---|---|
| 5,969,678 A * | 10/1999 | Stewart | 342/457 |
| 6,222,458 B1 | 4/2001 | Harris | 340/686.6 |
| 6,259,405 B1 * | 7/2001 | Stewart et al. | 342/457 |
| 6,493,550 B1 * | 12/2002 | Raith | 455/422.1 |
| 6,640,098 B1 * | 10/2003 | Roundtree | 455/414.2 |
| 6,694,143 B1 * | 2/2004 | Beamish et al. | 455/456.1 |
| 6,697,018 B1 * | 2/2004 | Stewart | 342/386 |
| 6,714,778 B1 * | 3/2004 | Nykänen et al. | 455/414.1 |
| 6,748,195 B1 * | 6/2004 | Phillips | 455/41.2 |
| 6,759,960 B1 * | 7/2004 | Stewart | 340/573.1 |
| 2002/0173295 A1 * | 11/2002 | Nykänen et al. | 455/414 |
| 2003/0058808 A1 * | 3/2003 | Eaton et al. | 370/310 |

FOREIGN PATENT DOCUMENTS

| | | |
|---|---|---|
| WO | WO 9922493 A2 * | 5/1999 |
| WO | 01/42894 | 6/2001 |
| WO | 01/86515 | 11/2001 |
| WO | 01/86881 | 11/2001 |

OTHER PUBLICATIONS

European Patent Office; International Search Report for International Application No. PCT/IB02/05800; dated Jul. 10, 2003; pp. 1-7.

Specification of the Bluetooth System; dated Dec. 1, 1999; pp. 1, 323-384.

Specification of the Bluetooth System; dated Dec. 1, 1999; pp. 1, 95-126.

(Continued)

*Primary Examiner*—Joseph Feild
*Assistant Examiner*—Julio Perez
(74) *Attorney, Agent, or Firm*—Vedder, Price, Kaufman & Kammholz, P.C.

(57) ABSTRACT

"Context" of an environment or area is considered to be one or more characteristics of the environment or area, manifested by the presence of various types of equipment or devices. Detection of various types of devices and equipment in a localized area is by way of short-range wireless signals over which data about the devices is transmitted to one or more subscriber units. The subscriber units can forward context-determinative data and information to a service provider which can vicariously use the equipment or devices in the area via the subscriber device.

20 Claims, 8 Drawing Sheets

OTHER PUBLICATIONS

Haartsen, Jaap; Bluetooth—The universal radio interface for ad hoc, wireless connectivity; Ericsson Review; 1998; pp. 110-117; No. 3; Stockholm, SE., no month listed.

Fano, A. "What are a Location's File and Edit Menus?" Workshops on Situated Interaction in Ubiquitous Computing at CHI 2000, Apr. 3, 2000, slides 1-12, Karlsruhe, Germany.

Fano, A., "Shopper's Eye: Using Location-based Filtering for a Shopping Agent . . . " Intl. Conf. of Auto. Agents: Proc. of 2nd Intl. Conf. 1998, pp. 416-421, Minn. MN.

Schmidt, A., "Advanced Interaction in Context", Lecture Notes in Computer Science, 1999, pp. 89-101, vol. 1707, Springer Verlag, Heidelberg.

Brody, A. "Pocket Bargain Finder: A Handheld Device for Augmented Commerce," Lecture Notes in Computer Science, 1999, pp. 44-51, 1999, vol. 1707, Springer-Verlag, Heidelberg.

McCarthy, F., "ActiveMap: A Visualization Tool for Location Awareness to Support Informal Interactions", Lecture Notes in Comp. Science, 1999, pp. 158-170, Vo. 1707, Springer Verlag, Heidelberg.

Beigl, M., "Point & Click—Interaction in Smart Environments," Lecture Notes in Computer Science, 1999, pp. 311-313, vol. 1707, Springer Verlag, Heidelberg.

Fano, A., "What are a Location's "File" and "Edit" Menus." Personal and Ubiquitous Computing, Feb. 2001, pp. 12-15, vol. 5, No. 1, Springer Verlag, Heidelberg.

* cited by examiner

DETERMINING THE CONTEXT OF SURROUNDINGS

FIELD OF THE INVENTION

This invention relates to telecommunications. In particular, this invention relates to a method and apparatus for determining "context," which is considered herein, and to be the interrelated conditions in which a thing exists or an event occurs.

BACKGROUND OF THE INVENTION

Two-way wireless communication has become a nearly ubiquitous service. Cellular and 900 MHz. "PCS" (personal communications systems) provide instantaneous voice and data communications to and from portable subscriber units (e.g., a cellular telephone, pager or two-way radio) via a communication system infrastructure (e.g., one or more base stations and controllers).

The next generation of mobile communication services will likely be expected to do more than just provide two-way communications. In addition to supplying communications, the next generation of communication services will likely provide the ability to detect a user's location and environments in which the user is located. By knowing or detecting a user's location or environment, ancillary services can be rendered to the wireless communication subscriber through his or her wireless communications device. Ancillary services that are derived from knowing a persons surroundings or environment can provide additional revenue streams to the service providers that deliver them.

SUMMARY OF THE INVENTION

The local environment or context in which a wireless subscriber unit is located at any given instant can be determined from information that is broadcast to the subscriber unit from context-determinative devices using short-range wireless signals, such as Bluetooth. By using short-range wireless signals, only devices that are in relative close proximity to the subscriber unit affect the determination of the subscriber unit's context. In one embodiment, information from devices within range of each other is used by the various devices to determine the context in which they each operate. In another embodiment, information from devices is collected by a short-range wireless subscriber unit, which preferably can be carried by a person, such as a personal digital assistant (PDA), cellular telephone, pager or the like, is used to determine the context in which the subscriber unit is located. In yet another embodiment, context determinative information (i.e., information that effects or creates or defines a "context" or from which a "context" can be calculated) is forwarded to a data collector whereat the collected information is processed to identify or calculate (and therefore "determine" context) the context whereat the subscriber unit, and possibly its operator, is located. Information about the present location or context can be returned to the subscriber unit. In another embodiment, context is determined by processing information within the short-range wireless subscriber unit.

Detected context of wireless subscriber units can be sent to, or collected by, a service provider for other uses. The detected context of a subscriber unit can be used by a service provider to provide ancillary services, such as context-related advertising and context-related information or assistance to both the subscriber and to other third parties.

DETAILED DESCRIPTION OF THE PREFERRED EMBODIMENT

Figure 1:
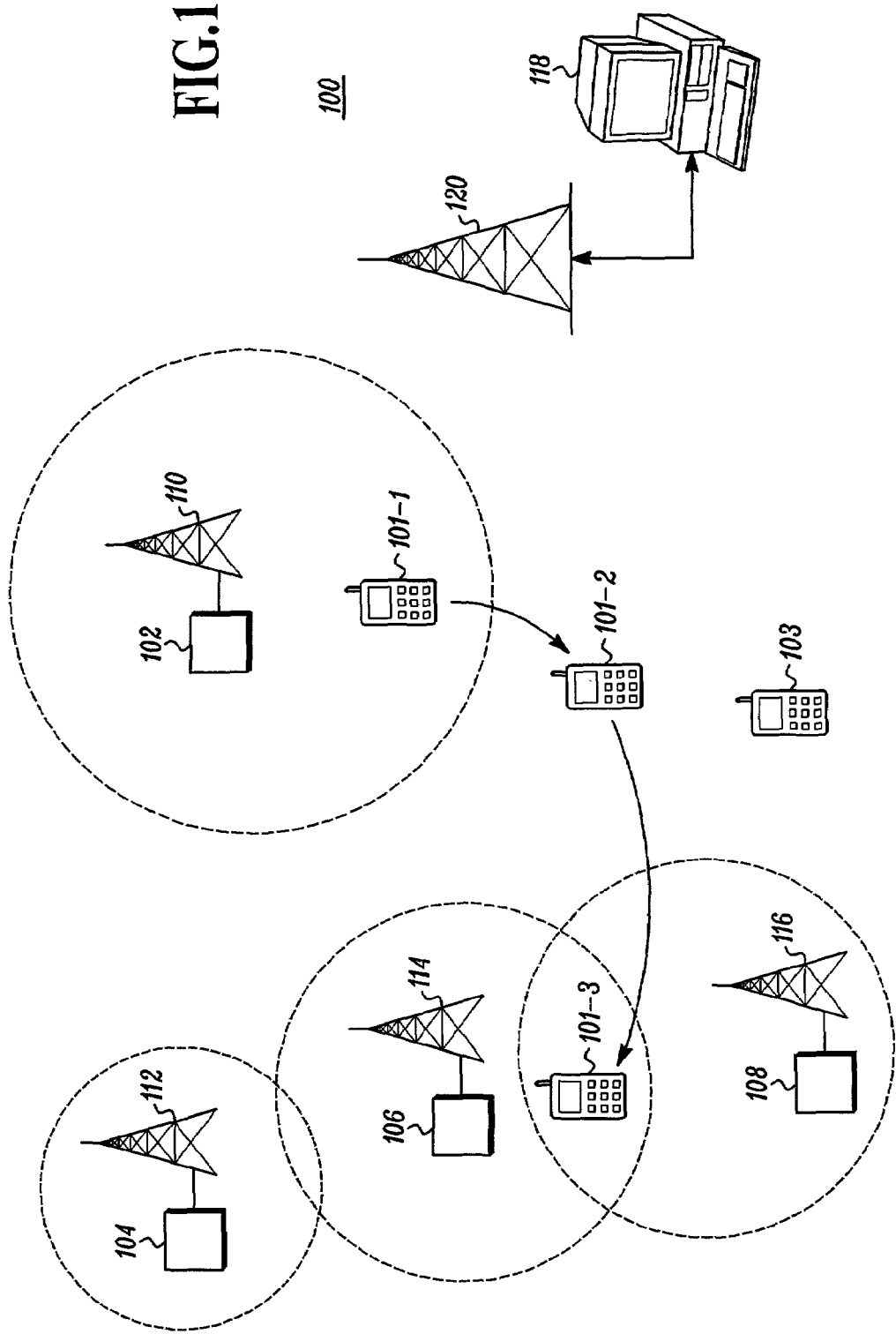
FIG. 1 depicts a simplified schematic representation of a communication system for determining contextual surroundings using short-range wireless signals.

FIG. 1 shows a simplified schematic representation of a communication system 100 for determining the contextual surroundings of one or more subscriber units 101 and 103 (and therefore, the contextual surroundings of a person using the subscriber units 101 and 103) using short-range wireless signals as well as for determining the contextual surroundings of various appliances, equipment and other devices, all of the presences of which are context determinative. For purposes of this disclosure "context" is considered to be one or more interrelated conditions in which a thing, such as the subscriber units 101 and 103 or the devices 102, 104, 106 and 108 exist or in which an event occurs. Thus, the "context" of a subscriber unit 101 and 103, which can be embodied in part by a personal digital assistant (PDA), cellular telephone, pager or the like, is considered to be an environment in which the subscriber unit 101, 103 is located. Inasmuch as "context" is an environment in which a subscriber unit 101, 103 or device 102, 104, 106 and 108 is located, "context" can also include, or be affected by, context-determined services that are provided to the subscriber unit 101, 103 by an external service provider as well as non-context-determined services that are available or unavailable to the subscriber unit 101, 103 within a geographic area. By operatively coupling a subscriber unit 101, 103 or other context-determining device,(e.g., device 106) to a short-range wireless signal transceiver using a standard communications protocol, such as Bluetooth, the subscriber unit 101, 103 or other device can effectively determine its context (in the geographic coverage area of the short-range wireless signals) from signals broadcast from other context determinative devices such as other subscriber units 103 or transceiver devices 102, 104, and 108 that also use the same communication protocol.

Each transceiver device 102, 104, 106 and 108 in a given area will have its own context that is determined by other context-determining devices in the area; however, the context of one particular device, (e.g., the device identified by reference numeral 102) in an area is not necessarily the same context of another device, (e.g., the device identified by reference numerals 104, 106 and 108) in the same area. In other words, context is viewed from the perspective of a particular device 102, 104, 106 and 108 and subscriber unit 101, 103.

Context can be derived or inferred from the presence of certain other devices in a given area, whether those devices are the aforementioned subscriber units or "devices. " Context can also be derived or inferred from measurable characteristics of equipment and fixtures in an area proximate to (or surrounding) a person or device and which effectively define an environment merely by their presence or operation. By way of example, the presence and operation of metal cutting, bending and stamping equipment define the environment, (i.e., the context) of many heavy industries and manufacturing. Such equipment can be considered to correspond to the devices identified by reference numerals 102, 104, 106, and 108 in FIG. 1. Detection of such equipment can be used to infer that a subscriber unit receiving one or more of the signals from such equipment is, or might be, in a factory of some sort. Imaging equipment such as x-ray machines, CT-scanners and ultrasound imaging equipment define environments (i.e., the "context") commonly found in most hospitals and medical facilities. Such imaging equipment can also be considered to be represented by the devices identified by reference numerals 102, 104, 106 and 108. Detection of the presence or operation of devices like such imaging equipment could be used to infer that the subscriber unit 101 shown in FIG. 1 (and a person carrying it) is in or near a hospital. By detecting that a person is proximate to such imaging equipment, or that a person has been proximate to such equipment over time, it can also be reasonably be inferred that the person has reason to be near such devices. It would also be reasonable to infer that the person might need or want to operate or use such equipment. Accordingly, for purposes of this disclosure, determining "context" should be construed to also include determining what a person wants or needs to do in a particular location or area, by the presence and/or operation of certain kinds of devices. With respect to the aforementioned example of detecting the presence and operation of imaging equipment, by tracking usage of the detected imaging equipment over time, a person's cumulative exposure to harmful radiation can be derived and in so doing, provide a mechanism by which excess exposure might be avoided. Even the contents of vending machines (vended laundry detergents vs. vended soft drinks or foods) can also be indicative of an environment or "context."

By knowing the presence, status, operation and usage of certain kinds of devices, equipment, appliances and machinery in a given area, the nature or kind of environment, (i.e., the context) in which such devices are located can be fairly accurately determined. Once a subscriber unit's context is determined, information that is particularly pertinent to a subscriber unit user in the current context can then be calculated locally within the subscriber unit or calculated remotely and thereafter provided to a person through the subscriber unit. By way of example, when short range wireless signals from a soft drink vending machine are detected by a subscriber unit, information can be obtained from the soda vending machine that could include the machine's presence, its contents or product offerings, its location relative to the subscriber unit or other soda vending machines and from such information, a person could decide whether to purchase a product and if so, how to locate the machine. An appropriately capable subscriber unit 101 that "hears" signals from the vending machine and that can communicate with the vending machine can query the vending machine for pertinent status information, such as whether it is operational, the products it offers and product prices.

The presence, status, operation and usage of devices 102, 104, 106 and 108, such as (but not limited to) manufacturing equipment, appliances and machinery in a localized region or area can be readily determined if such information is broadcast by the devices using short range wireless signals broadcast from signal transmitters that are operatively coupled to, i.e., "associated with" each such device. When another compatible short-range wireless signal device or subscriber unit obtains information that is broadcast from other devices in the local region, the context in which the other devices are located can be determined from the other devices' presence, as well their operation and status. Once the context is calculated or determined (either locally or remotely) such information can be forwarded to other computers for further processing. In the preferred embodiment, disparate devices can "talk" to each other if they use a common communications protocol such as "Bluetooth" which is a well known standard by which, at present, certain types of devices (e.g., cell phones) can establish the presence of other Bluetooth-enabled devices geographically proximate to each other. It is expected that extensions or embellishments to the Bluetooth standard, including but, not limited to, equipment profiles, will enable Bluetooth to provide a plethora of remote functionality. Bluetooth is briefly described hereinafter.

In FIG. 1 there is shown a geographic area or region in which there might be located appliances such as, but not limited to: electric generating equipment; medical imaging and test equipment; heating, ventilating and refrigeration systems; telephone switching equipment; manufacturing or other electrically-operated machines, all of which are considered hereinafter as "transceiver devices" and identified in FIG. 1 by reference numerals 102, 104, 106 and 108.

Attached to each device 102, 104, 106 and 108, is an associated, short-range wireless signal transceiver 110, 112, 114, 116 that is compatible with at least one communications standard by which the transceivers can readily communicate with each other so that the various transceivers can at least establish the presence of each other within the coverage area of the short range signals.

In addition to being able to simply establish the presence of other devices, in a preferred embodiment, each of the devices 102, 104, 106 and 108 includes, or is coupled to, a processor or other device by which information about the device 102, 104, 106 and 108 (e.g., functionality, operation, etc.) is collected, formatted and sent to the associated radio transceiver 110, 112, 114, 116 for broadcast using the short range wireless signals. In the preferred embodiment, the devices 102, 104, 106 and 108 and their associated radio transceivers 110, 112, 114 and 116 not only broadcast their own presence and status but also receive information announcing the presence and status of each other as well as receiving information announcing the presence and status of subscriber units 101 and 103. In so doing, the devices 102, 104, 106 and 108 can determine their own context (with respect to other devices and subscriber units) but also act as context determinative devices with respect to those other devices and subscriber units.

As shown in FIG. 1, a first transceiver (i.e., transmitter and receiver combination, well-known to those of ordinary skill in the art of wireless communications) 110 is operatively coupled to a first device that is identified by reference numeral 102; a second transceiver 112 is operatively coupled to a second device identified by reference numeral 104; a third transceiver 114 is coupled to a third device 106 while a fourth transceiver 116 is coupled to a device identified by reference numeral 108. The distance between a device and the transceiver to which it is operatively coupled, should be kept to a minimum in order to help insure that the subscriber's device proximity to the transceiver and its associated device is substantially the same. The devices need not be functionally related but to be part of a functional system they need to use a common communications protocol.

In application, the various devices 110, 112, 114 and 116 can include, but are not limited to factory or retail store appliances, equipment, computers and the like, the presence, operation and status of which can be measured and the knowledge of which provide value and/or interest. Particular devices are not shown for purposes of brevity and the identity of particular kinds of monitored equipment is not germane to the invention disclosed and claimed herein. As set forth above, the mere presence of some kinds of devices suggests a location or environment or "context" whereat such machines are commonly found.

Figure 2:
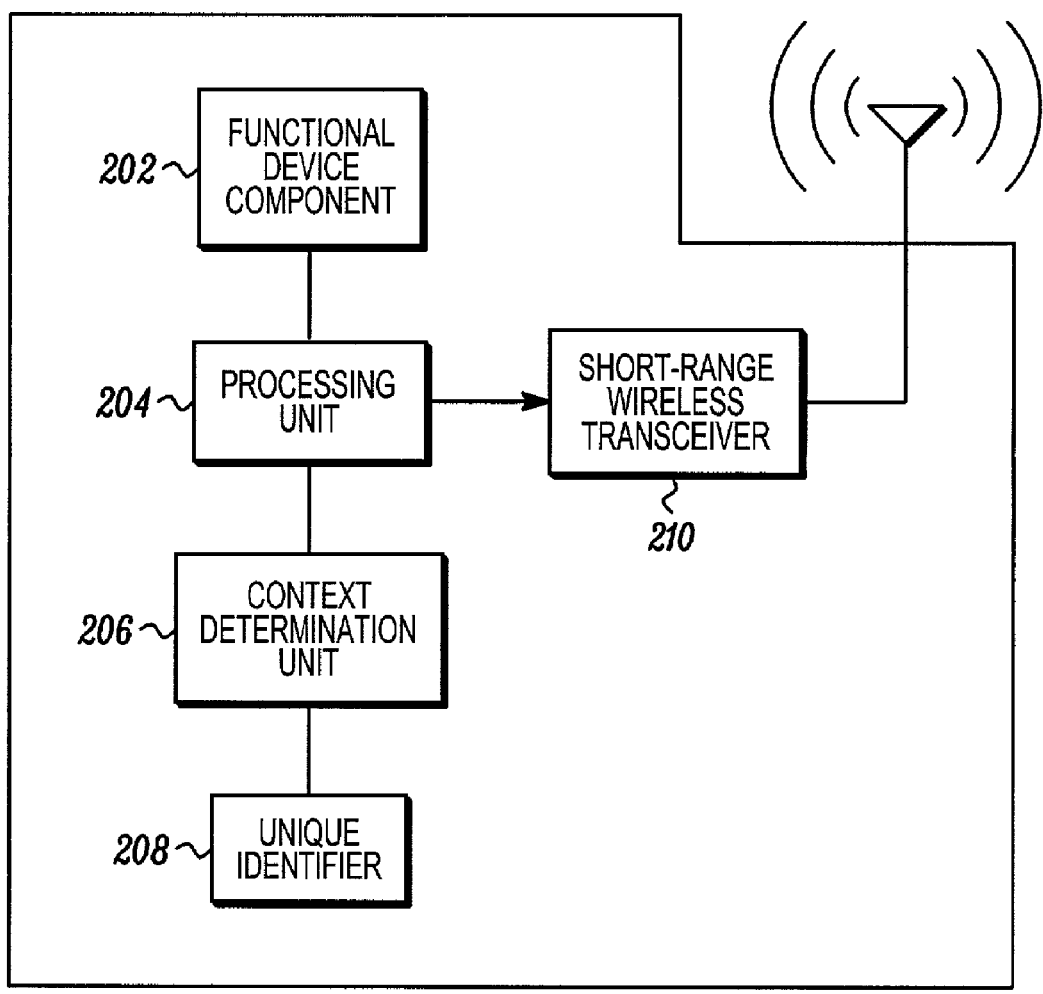
FIG. 2 depicts a simplified block diagram of a short-range wireless transceiver for use with, and in, the system shown in FIG. 1 and which is capable of transmission and reception.

FIG. 2 depicts a simplified block diagram of the functional elements of a transceiver device 200 that could be used in the system depicted in FIG. 1. In FIG. 2, a functional device represented by reference numeral 202 corresponds to a transceiver device 102, 104, 106 or 108 as described above, the presence, status and operation of which is to be detected and monitored in a limited area using short range wireless signals broadcast from each device. By way of example, the functional device component 202 can be a vending machine, microwave oven, computerized tomography (CT) scanner or other piece or system of equipment, suitably coupled to a microprocessor or other processor.

The functional device component 202 is operatively coupled to a processing unit 204, typically embodied as one or more microprocessors or microcontrollers that execute program instructions stored in memory (not shown) but known to those of ordinary skill in the art to include devices such as semiconductor read only memory (ROM), random access memory (RAM), magnetic disk and equivalents thereof Those skilled in the art will also recognize that determining the status or operation of a device such as a vending machine or other device by way of a processor will require appropriate coupling of the processor 204 to the device component 202, typically using one or more analog-to-digital (A/D) converters (to measure analog signal quantities), digital-to-analog converters (D/A) (to control a device) and other interfacing equipment, well-known to those of ordinary skill in the computer art.

A context determination unit 206 is preferably embodied as software stored in memory and which executes on or in the processor 204 so as to cause the processor 204 to read pertinent information, such as the state of the device (in service or out of service) directly from the device 202. Alternate embodiments of the context determination unit 206 would include specific circuitry to interface the processor 204 to context determining hardware (e.g., sensors, transducers and the A/Ds, D/As to couple them to a computer) in the functional device 202.

In the preferred embodiment, context determination unit (CDU) software obtains context determinative information from the functional device 202 for transmission via the short-range wireless transceiver 210 (including, but not limited to: a detector; demodulator/discriminator and a modulator and power amplifier). Examples of context determinative information obtained from the functional device would include, but not be limited to; the presence of a particular device 202; its operability (operable or failed); recent or historical device 202 usage over different time periods (operating cycles over time); potentially problematic conditions (e.g., an overheating motor). When the context determination unit is software that operates or runs on the processor 204, it (and therefore the processor) are responsible for performing the function of determining the functionality of the device 202, as well as its status (operative or inoperative) and historical activity, such as operating cycles per unit time.

The unique identifier 208 as shown in FIG. 2 is an identifier for devices that have their presence and status broadcast using short range wireless signals and in many respects is analogous to an eletronic serial number and mobile identification number used in cellar telephones in that it uniquely identifies the device 102, 104, 106 or 108 in a context determining communication system, such as the system shown in FIG. 1. Data that can be included in or with the unique identifier can also convey other information.

Figure 3:
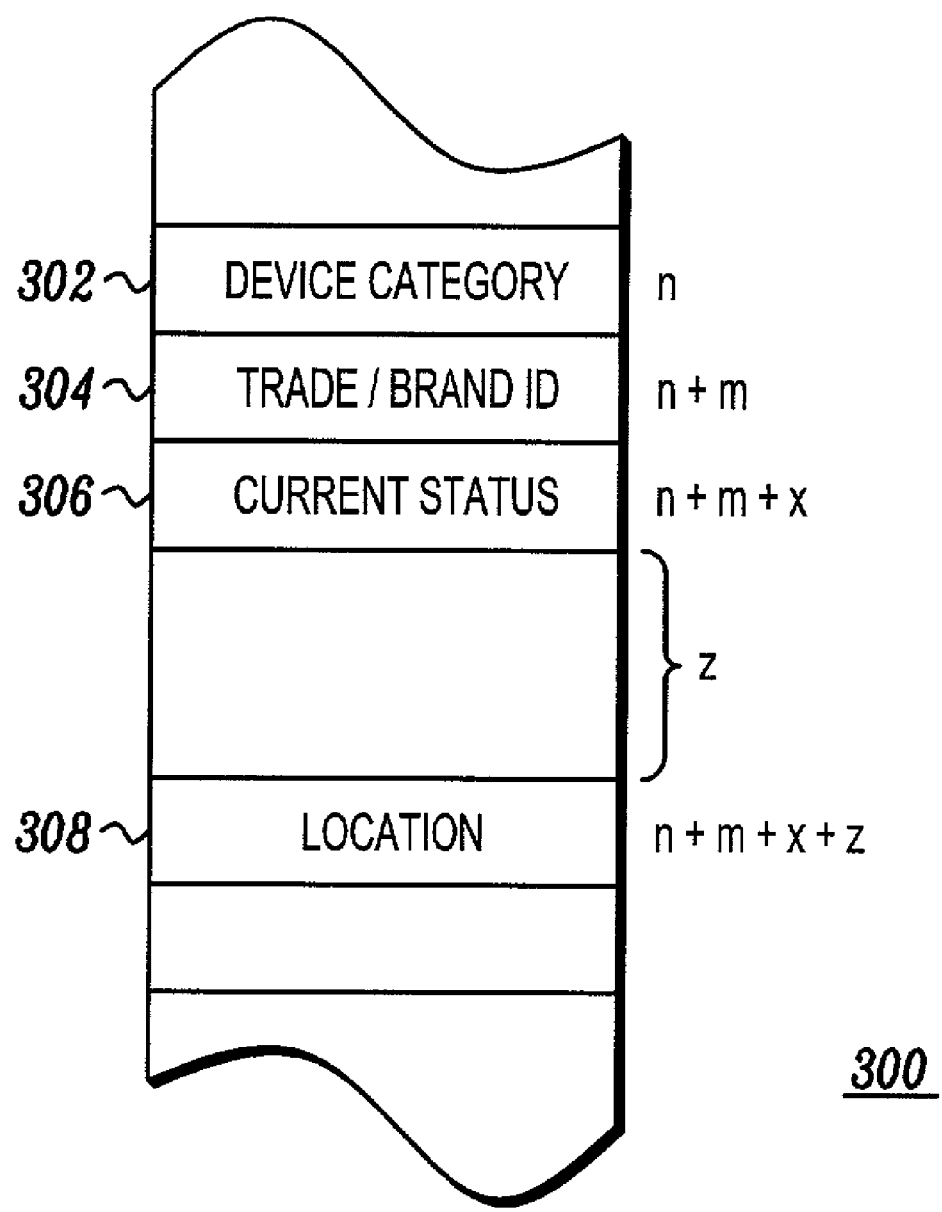
FIG. 3 depicts one embodiment of an identifier by which certain information related to environment or "context" is packaged in memory and formatted for transmission.

FIG. 3 depicts an example of a "unique identifier" that can be used to convey various pieces of information similar to a vehicle identification number (VIN) that uniquely identifies an automobile. In FIG. 2, a range of memory from address "n" to address "n+m+x+z" stores various data, including a unique identifier that is preferably implemented and embodied as a multi-byte data structure 300, stored in memory (not shown) coupled to the processor 204. The unique identifier 208 preferably identifies the device 202 by any appropriate data, such as by a category of all monitorable devices 302 (e.g., a COKE® or PEPSI® vending machine; diagnostic medical test equipment; office equipment, such as a copier or printer), brand names or trade names that the device is known as 304. Other data of a device that is shown in the data structure 300 and which indicates among other things, status (e.g., operative or failed) and historical or prior usage of the devices 306, 308 is not ordinarily part of the unique identifier.

In FIG. 2, the transceiver 210 for use with a device 102, 104, 106 and 108 receives (or collects) data from the processor 204, including the unique identifier data 300. In addition to simply sending a unique identifier, in an alternate embodiment, the processor can also acquire device 202 data (also referred to as "information") from the device 202 and formats that data for transmission by the transceiver 210.

By using short range wireless signals, information about one device 102, 104, 106 or 108 or subscriber unit 101 can be collected from it by another, communications-compatible device or from subscriber unit 103 when the devices and subscriber units are in relatively close proximity to each other. For purposes of this disclosure, "close proximity" and "short range" is ordinarily considered to be substantially less than the distance over which a cellular, PCS (personal communication system) or paging signal will propagate and typically on the order or less than 50 meters. Inasmuch as an objective of the present invention is to detect context in the immediate vicinity of a user, acquiring data of distant devices would adversely affect the ability of the subscriber units and devices to discern the presence and status of local devices and subscriber units of interest. In some embodiments of the present invention, "short range" would include distances greater than 50 meters because the distance over which the context of a subscriber unit is determined will be affected by the function and purpose of the subscriber unit. As an example, when an airplane is parked at a gate, on a tarmac, its context will be affected by other aircraft, ground vehicles and personnel that might be only a few meters distant. In contrast, the context of an airplane in flight and on final approach to an airport will be affected by aircraft that might be several hundred meters distant. Accordingly, for purposes of claim construction, the term "short-range" should not be limited to less than 50 meters but more generally also to distances that are relevant to the particular subscriber unit and its function. In most instances however, "short range" is considered to be on the order of 50 meters or less. At present, there is at least one short-range wireless communications standard known as the "Bluetooth" standard. Details of the Bluetooth standard are available from the official Bluetooth web site. The invention described and claimed herein should not be construed as limited to compliance with Bluetooth but should instead be understood to be useable with any short-range wireless communications protocol.

While FIG. 2 depicts the functional elements of a "device" that is identified in FIG. 1 by reference numerals 102, 104, 106 or 108 and which broadcasts and receives short range wireless signals (and that these signals include information that indicates at least the presence of the device but can also include other information as set forth above), many of the functional elements shown in FIG. 2 are also found in a short-range wireless subscriber unit 101 and 103 (shown in FIG. 1).

Figure 4:
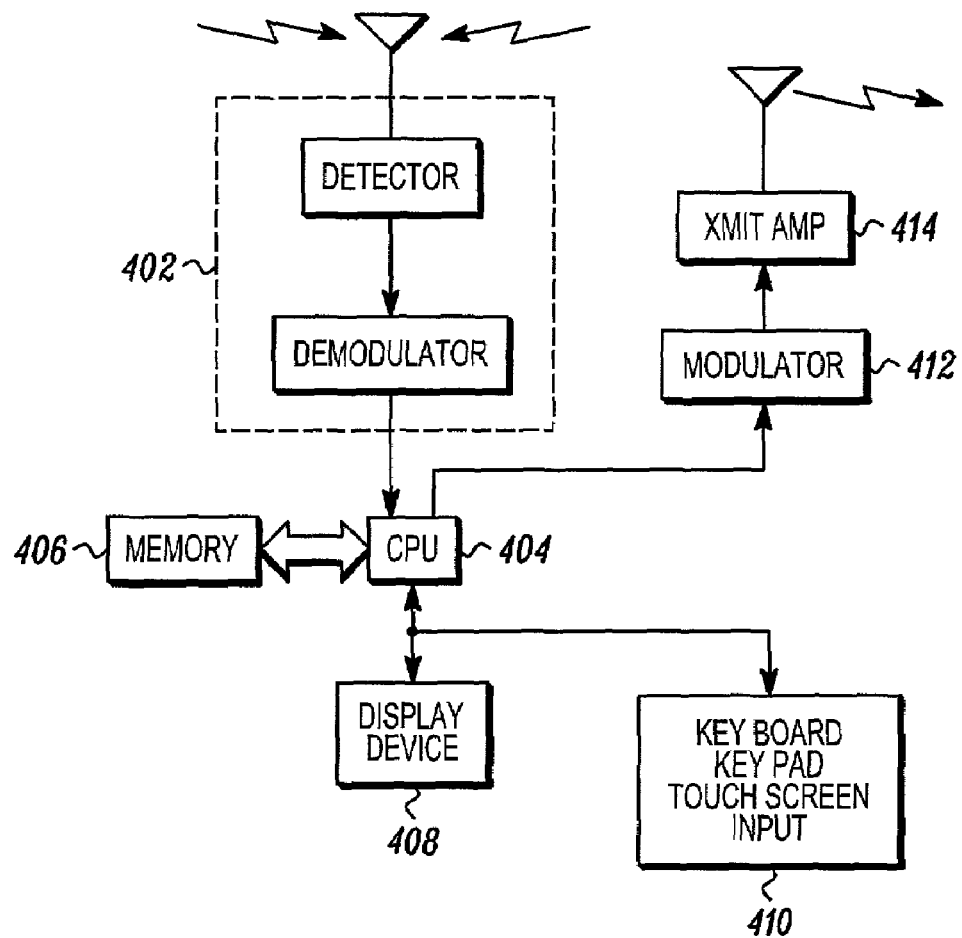
FIG. 4 depicts a simplified block diagram of the functional elements of a short range wireless subscriber unit capable of both transmission and reception.

FIG. 4 shows in greater detail, the functional elements of a short-range wireless signal transceiver 400 for use with both a subscriber unit and a device in a system such as that depicted in FIG. 1. In the preferred embodiment, the transceiver includes a detector/demodulator and discriminator 402 the output of which is coupled to a processor 404 that decodes information from demodulated signals output from the demodulator 402. Those skilled in the art will recognize that the transceiver circuitry includes the ability to accept or reject signal carrier based upon the relative signal strength of the received carrier. Determining carrier signal strength can be performed in either hardware or software but is in general performed by receiver circuitry that includes the detector and a discriminator.

Alternate and equivalent transceiver embodiments would employ infrared, ultraviolet or audio signals and require compatible transmitters and sensors in place of RF transmitters, receivers, modulators, and demodulators depicted in FIG. 4. A memory 406 from which executable instructions as well as data is read, stores various data structures of devices 102, 104, 106, or 108 known to be compatible with the system 100 shown in FIG. 1.

A function of the processor 404 of the subscriber unit 400 and its associated software is to recover from the detected and demodulated signals broadcast from the aforementioned devices 200, information about the devices. Information obtained from a signal received from one or more devices within range of the subscriber unit 400 is used to derive context-determinative information, which can be used to provide a plethora of ancillary services to the subscriber unit or the subscriber unit user.

In instances where context information needs to be displayed, information about the subscriber unit 400 surroundings can be displayed on a liquid crystal display screen 408 or other equivalent display devices such as a cathode ray tube (CRT) or via an audio output such as an "ear bud" all of which are considered for claim construction purposes to be equivalent user interfaces. In other instances, input queries or other input strings to a subscriber unit can be made via a keyboard, keypad, mouse, bar code reader or touch screen 410 enable a user to send text and data into the processor 404 as well for transmission via a modulator 412 and amplifier 414.

As depicted in FIG. 1, communications can take place between either a subscriber unit 101 (embodied as the subscriber unit 400 depicted in FIG. 4) or a device 102, 104, 106 and 108, and a base station of a service provider 118, 120. In such a mode of operation, a longer-range signal transmitter in the subscriber units or devices needs to be operatively coupled to the processor 404 shown in FIG. 4 so that re-transmission can be effectuated. Sending context-related information to distant processors enables the provision of other, ancillary services to a subscriber unit or a subscriber unit user.

By knowing the context in which a particular subscriber unit is located, information can be sent to the subscriber unit that is of importance to the subscriber unit user. By way of example and not of limitation, knowing that a subscriber unit is in a particular area of a particular retailer, vendors of particular products or services can deliver targeted information directly to the subscriber unit. Such targeted information can include targeted advertising, product offerings or sales incentives or product data or specifications. In another example, knowing that a subscriber unit is in a dangerous environment can be used to protect the subscriber unit user from unnecessary or prolonged exposure. In yet another application, attaching a subscriber unit to a shipping container can enable the container and its contents—to be tracked and located. In still another application, detecting context can be used to track the performance of employees by tracking the location of employees over time. Context can be used to track the operation and usage of equipment over time.

Ancillary services, such as those described above, can be provided by services providers that receive context information from subscriber units and/or context-determinative devices. In a preferred embodiment, context information is collected locally, i.e., proximate to the environment in which context is being measured. The collected context information is then transmitted to a service provider using more long-distance signals or perhaps a hard-wired connection by which context information can be sent off for processing required to provide ancillary services such as those mentioned above.

By way of example, information from a subscriber unit that detects the presence and operation of equipment and/or machinery that generates X-ray radiation can be forwarded to a medical service provider so as to monitor the instantaneous and cumulative expose to harmful radiation. The medical service provider can more accurately advise a user who is in a particular environment when his or her continued presence therein might be dangerous.

Information sent from a subscriber unit from which it could be inferred that the subscriber unit user is in a particular retail store can be used by a marketing services company to transmit informative messages to the subscriber unit or to instruct a sales representative of the store to provide assistance.

Information as to the location of a container that is equipped with a context-sensing subscriber unit can be used to locate the container and to determine its arrival at a particular destination. In order to provide such ancillary services, context information needs to be collected and processed.

By sending context information to remotely located service providers, such service providers can render valuable services to either a subscriber unit user or to other entities who might benefit from knowing the context of an individual thereby enabling the provision of services likely to be expected in the next generation of wireless communications devices and systems. The provision of such services can be a significant source of revenue to those who provide them. For claim construction purposes, any service rendered to a subscriber unit or a subscriber unit user that arises out of the determination of context or of the collection of context-determinative information is considered to be a context-relevant service. Any information provided or sent to a subscriber unit as a result of the determination of context or of the collection of context-determinative information is considered to be sending context-relevant information.

Only one transmitter is shown in FIG. 4 and depicted as simply the functionality of a modulator 412 and a modulated signal amplifier 414 as radio transmitter architecture is well known to those of ordinary skill in the art. For claim construction purpose, a transmitter of short range wireless signals can be considered to be embodied as the functionality of a modulator 412 and amplifier 414. In embodiments where a subscriber unit 101 or a device 102, 104, 106 and 108 or a base station 118 and 120 can transmit both short range and long range signals, two transmitters can be provided such that each transmitter is separately coupled to the CPU. A first transmitter can transmit short range signals whereas a second transmitter transmits the longer-range signals. Still other and equivalent embodiments include using a single transmitter which adjusts is output power level to one level (including also output frequency, modulation and/or information encoding) for short range communications and to another level (frequency, modulation and encoding) for long range communications.

The re-transmitted information from one or more subscriber units 101, 103 or devices 102, 104, 106 or 108 can be sent via a long-range transmitter to another radio subscriber unit and computer on 118 (FIG. 1) for more sophisticated analysis or aggregation. Information from the service provider can be sent back to the various devices and subscriber units for display on the output display device 408 and might include by way of example, the different brands of beverages offered in different vending machines in one or more vending machine food service areas.

Depending upon the detected context using the system depicted in FIG. 1 and enabled with the devices depicted in FIGS. 2, 3 and 4, a third-party service provider can send to the subscriber unit 101 information that can be especially pertinent to a context in which the subscriber unit is detected.

With reference to FIG. 1, if information-bearing signals from a first device 102 are detected when the subscriber unit is in a first venue, identified by reference numeral 101-1 and this information is forwarded to the service provider 118, the service provider 118 can with reasonable certainty ascertain a particular context associated with the first device using information that device 102 transmitted and which determines the context of subscriber unit 101-1 while it is proximate to device 102.

If at a later time, the subscriber unit 101 has moved to a different location, identified in FIG. 1 by reference numeral 101-2, whereat there are no short-range wireless signals recoverable, the service provider can reasonably determine that the subscriber unit 101 has left the context proximate to the first device 102.

At yet a later time when the subscriber unit 101 has moved to a third location, denoted by reference numeral 101-3, whereat two different signals are "heard" by the subscriber unit, the context at the location denoted by reference numeral 101-3 can determined from signals from the third and fourth devices 106 and 108.

By tracking context of a subscriber unit 101 over time, a service provider can determine context (i.e. environments) in which the subscriber unit 101 has been present. Stated alternatively, by way of the information emitted from the various devices 102, 104, 106 and 108 with which a subscriber unit has been in communication with, it is possible to determine the contexts or environments into which the subscriber unit has been transported. From the information obtained from the various context-determining devices 102, 104, 106 and 108, helpful information can be sent to the subscriber unit from either the devices or the service provider 118.

Figure 5:
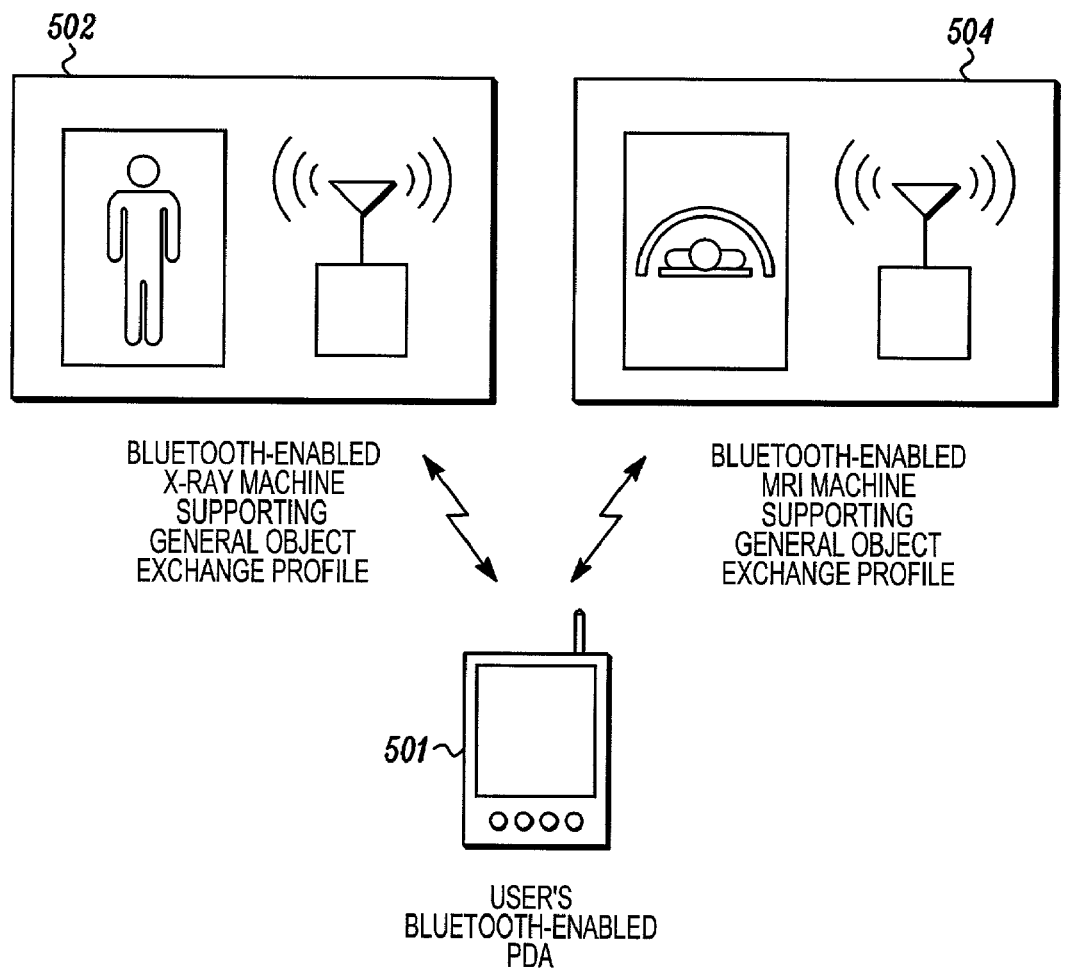
FIG. 5 depicts an exemplary use of a short-range wireless context-determining communications system used to detect the presence and operation of imaging equipment.

FIG. 5 shows a diagram of one exemplary application of context detection.

In FIG. 5, a Bluetooth-enabled and compliant subscriber unit 501 is proximate to a Bluetooth-enabled and compliant x-ray machine 502 and a Bluetooth-enabled and compliant MRI imager 504. When the subscriber unit 501 is within "range" of signals broadcast from the x-ray machine 502 and the MRI 504, by virtue of the radio signals and information modulated onto the signals, the subscriber device 501 can detect the presence of the machines, each occurrence of the machines' operation, data log each operation and at a user's option, forward the data collected from the machines to a central data repository 120 for purposes of monitoring a person's accumulated exposure to radiation.

Figure 6:
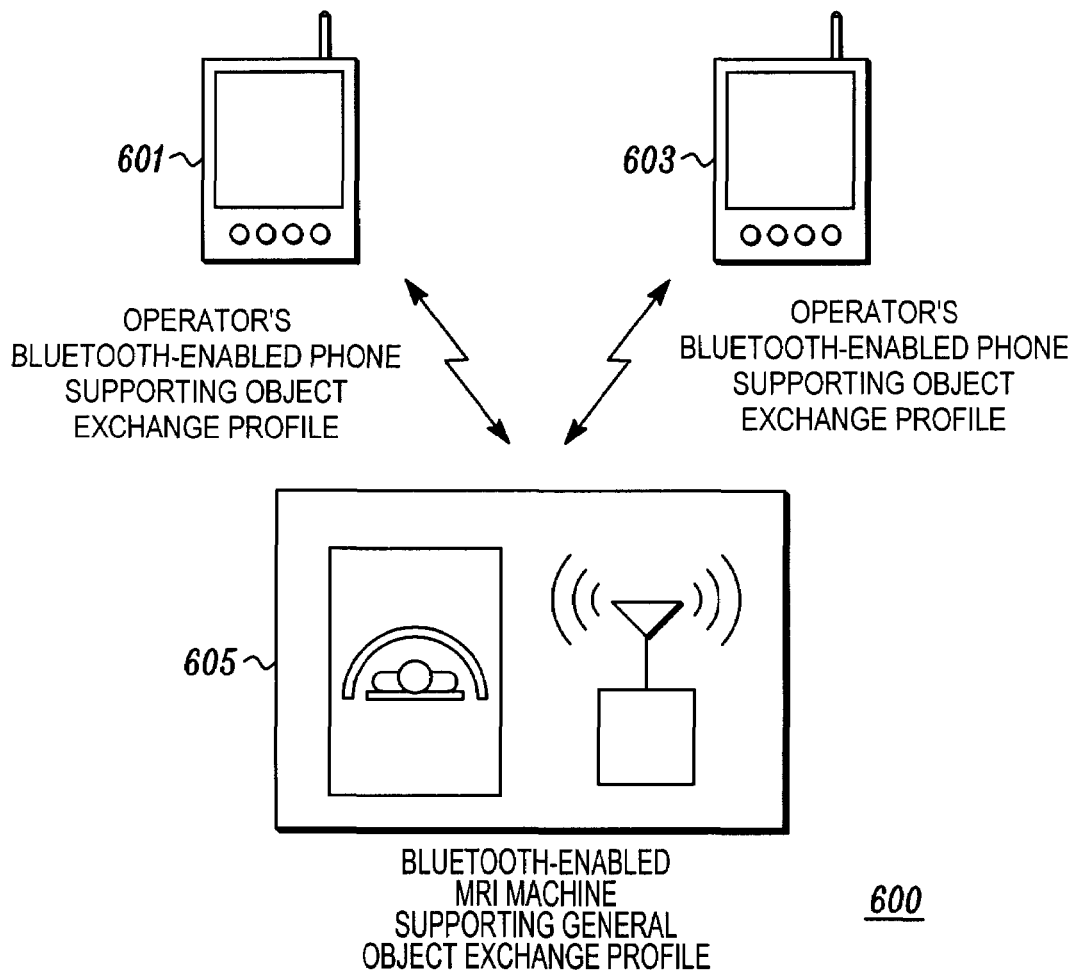
FIG. 6 depicts another exemplary use of short-range wireless context-determining communications system.

FIG. 6 depicts a system for detecting medical equipment or other devices 600 as another application of context detection.

In FIG. 6, Bluetooth enabled subscriber units 601 and 603 are equipped with short-range wireless signal transceivers. The subscriber units not only detect the presence of a Bluetooth-enabled and compliant MRI device 605 but also send signals to the MRI device 605 using the short-range wireless transceiver 210 (as shown in FIG. 2) with which the MRI device is equipped. In such an application, the MRI can determine its context with respect to the subscriber units 601 and 603 but the subscriber units 601 and 603 can also be used to control the MRI 605 if the subscriber units 601 and 603 are provided with knowledge of the operation of the MRI 605 by way of an equipment or device profile.

In such an application, an operator of one of the subscriber units 601 and 603 can attempt to execute control commands to the MRI device 605, albeit after the MRI 605 establishes that the two subscriber devices are eligible to control its operation. By virtue of the MRI device's detection of short range wireless signals from one or more subscriber units, the MRI device 605 preferably queries the subscriber units it hears for validation data. Validation data would include any indicia of authorization to use and control the MRI device 605 which can be stored within the memory or unique identifier data structure stored within the MRI device 605.

Upon the MRI device's 605 determination that a subscriber unit 601 or 603 was authorized to access the device 605, remote operation of the MRI can be established using the subscriber device 601 or 603 as a sort of hand-held remote, albeit via short range wireless signals, such as the Bluetooth standard.

Figure 7:
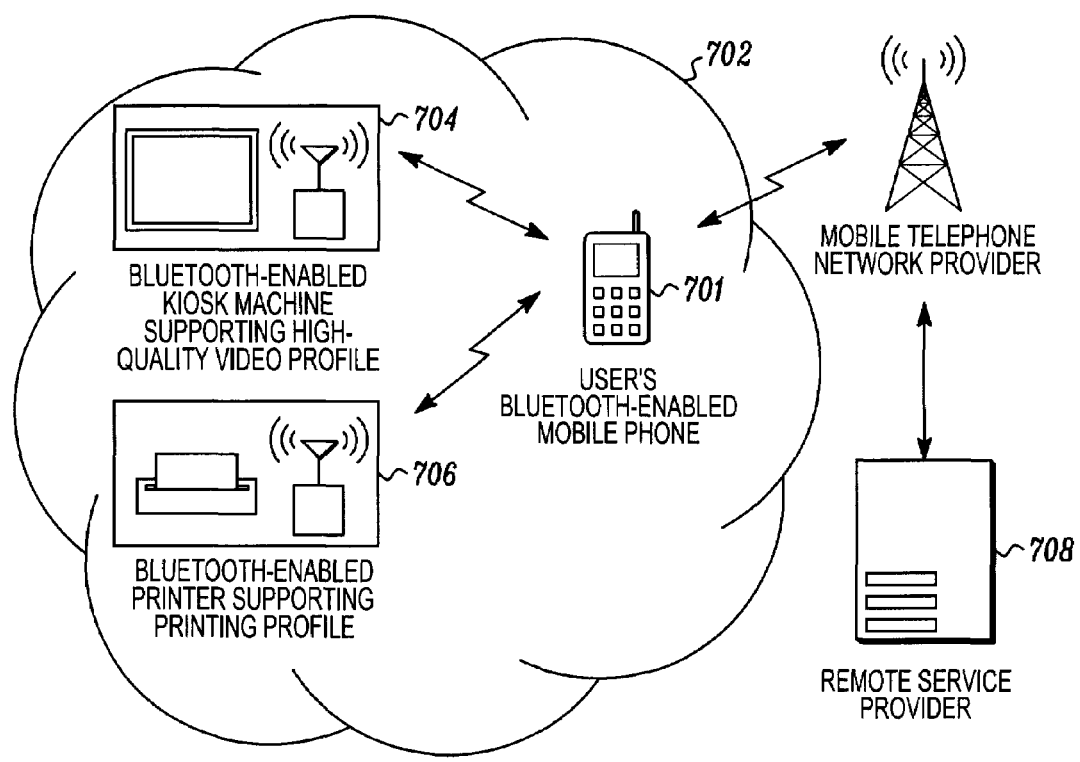
FIG. 7 depicts a block diagram of another exemplary use of short-range wireless context-determining communications system.

FIG. 7 depicts yet another use of short range wireless signals to detect context.

In FIG. 7, a Bluetooth-enabled and compliant mobile phone (cellular phone, PCS phone or SMR two-way radio) enters a venue 702 and detects the short-range radio signals being broadcast by a Bluetooth-enabled and compliant display kiosk 704 and a Bluetooth-enabled and compliant printer kiosk 706.

As the subscriber unit 701 hears the Bluetooth compliant signals from the display kiosk 704 and printer kiosk 706, it can ascertain what the kiosks are as well as their capabilities, i.e., display and print. Inasmuch as the subscriber unit is capable of long-range communications via cellular, PCS or SMR radio or the like, a calling or called party can send data to the subscriber unit for either printing or display by forwarding such data to the subscriber unit 701. Upon receipt by the subscriber unit 701, resources in the kiosks 704 and 706 can be used to display or print files residing in the subscriber unit 701 by wirelessly transferring them to the kiosk-resident display device or printer device. Alternatively, a higher bandwidth connection could be made directly to one of the kiosks 704 or 706 for increased service fidelity. By knowing the context of the subscriber unit 701, i.e., the surroundings including resources such as the display and printer kiosks, a remote service provider 708 can extend services to the subscriber unit 701 that it alone cannot provide.

Figure 8:
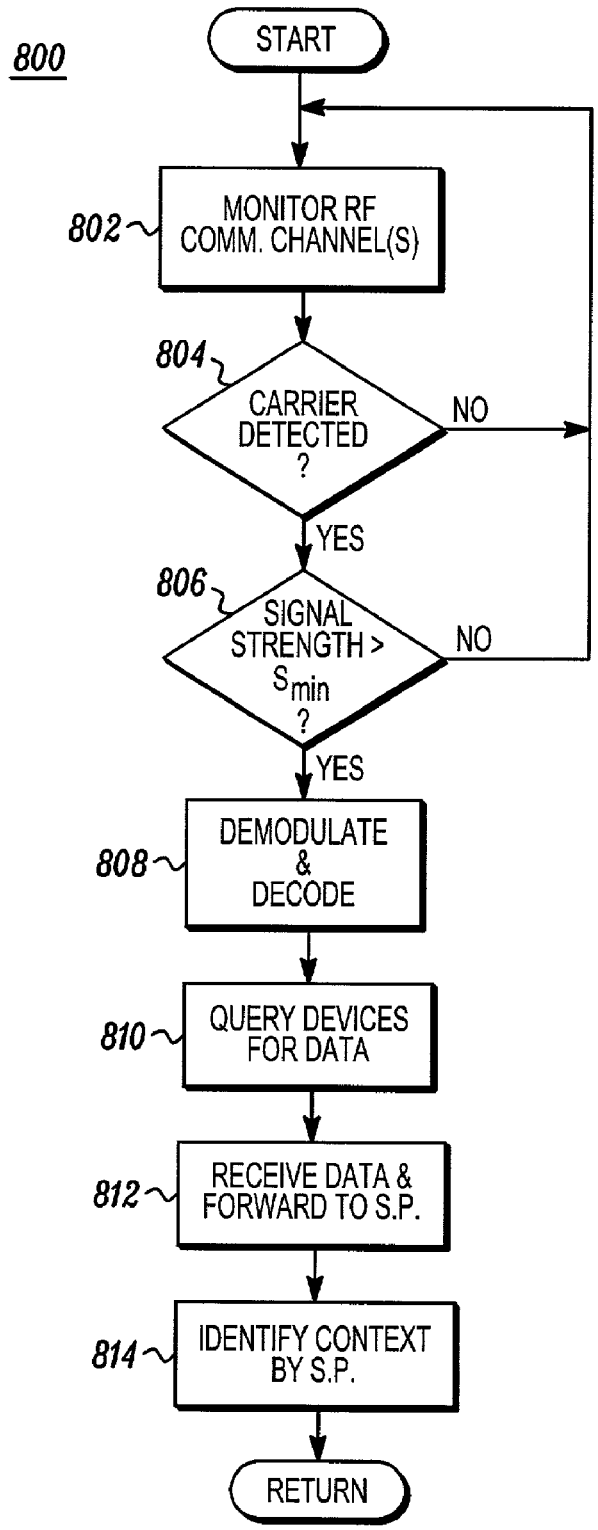
FIG. 8 depicts a simplified flow chart of the steps of a method for determining context.

FIG. 8 depicts steps of a method for determining the "context" surrounding a short range wireless subscriber unit, such as the one depicted in FIG. 1 and identified therein by reference numeral 101-1, 101-2 and 101-3, the functional elements of which are depicted in FIG. 4.

In step 802, the subscriber unit receiver monitors one or more radio frequencies, infrared wavelengths or audio frequencies for the presence or absence of recoverable signals. Upon the detection of a carrier in step 804, a decision is made in step 806 as to whether the detected carrier signal strength is usable, i.e., above an empirically-determined threshold indicative of whether the carrier source is within the aforementioned "short range and which is required to sustain reliable communications." In many instances, a marginal carrier level will result in a determination that no short-range wireless signal source is present, as shown by the return of program control to step 802 from both decision steps 804 and 806.

In step 808, the subscriber unit recovers the data from the detected (and sufficiently robust) carrier and in step 810, two-way communications are established with the detected devices. Information recovered from the data preferably provides a determination of simply the presence of the device but also its status; operation and/or availability for further service.

In step 812, data recovered from the detected devices is forwarded to a context determining service provider, which has at a remote location, a data base and processing capability to analyze data and information from the devices and derive therefrom, the "context" of the subscriber unit. In an alternate and equivalent embodiment, data from detected devices can be processed locally, i.e., by the processor within a device or subscriber unit so as to "locally" determine context. At step 814, the service provider processes data received by the subscriber and forwarded to the service provider to determine the subscriber's context. The service provider can thereafter extend other services to the subscriber unit from or by the detected devices. In an alternate embodiment, a service provider that detects certain contexts can relay information or perhaps advertising to a subscriber unit based upon its context determination.

It should be apparent that from the foregoing, that by periodically broadcasting information from various kinds of equipment and devices via short-range wireless signals using a recognizable protocol such as Bluetooth that the detection of such signals inherently provides usable information that is potentially useful. The resources of such equipment and devices can be more readily used and recorded.

What is claimed is:

1. A method comprising:
   detecting, short range wireless signals from at least one device, wherein said device comprises at least one of one or more context-determining devices and one or more subscriber units;
   recovering, from said detected short range wireless signals, information that conveys at least the presence of said at least one device;
   deriving contextual information from said recovered information; and
   forwarding said derived contextual information to a remote data collector using a long range wireless transmitter.

2. The method of claim 1 wherein said step of recovering information further includes recovering at least one of:
   one or more usages of said at least one device;
   a status of of said at least one device;
   one or more operations of said at least one device;
   prior to the step of deriving contextual information.

3. A wireless device comprising:
   a short range wireless receiver configured to detect short range wireless signals from at least one device, wherein said device includes at least one of one or more context-determining devices and one or more subscriber units;
   a processing unit configured to recover, from said detected short range wireless signals, information that conveys at least the presence of said at least one device, said processing unit further configured to derive contextual information from said recovered information; and
   a long range wireless transmitter configured to transmit said derived contextual information to a remote data collector.

4. The device of claim 3, wherein a processing unit is further configured to recover from said detected short range wireless signals, information that conveys at least one of:
   one or more usages of said at least one device;
   a status of said at least one device; and
   one or more operations of said at least one device.

5. A method comprising:
   detecting, short range wireless signals from at least one device, wherein said device comprises one of one or more context-determining devices and one or more subscriber units;
   recovering, from said detected short range wireless signals, information that conveys at least the presence of said at least one device;
   deriving contextual information from said recovered information, wherein said derived contextual information includes at least information relating to one or more available services; and
   forwarding said derived contextual information to at least one of a remote data collector and a remote service provider using a long range wireless transmitter.

6. The method of claim 5, wherein the information relating to one or more available services includes information relating to one or more service capabilities of said at least one device.

7. The method of claim 5, wherein said step of recovering information further includes recovering at least one of:
   one or more usages of said at least one device;

a status of said at least one device; and one or more operations of said at least one device;

prior to the step of deriving contextual information.

8. A method comprising:

detecting, short range wireless signals from at least one device, wherein said device comprises one of one or more context-determining devices and one or more subscriber units;

recovering, from said detected short range wireless signals, information that conveys at least the presence of said at least one device;

deriving contextual information from said recovered information, wherein said derived contextual information includes at least information relating to one or more available services;

forwarding said derived contextual information to a remote service provider using a long range wireless transmitter; and receiving information relating to a service provided by said remote service provider.

9. A device comprising:

a short range wireless receiver configured to detect short range wireless signals from at least one device, wherein said device comprises at least one of one or more context-determining devices and one or more subscriber units;

a processing unit configured to recover, from said detected short range wireless signals, information that conveys at least the presence of said at least one device, said processing unit further configured to derive contextual information from said recovered information, wherein said derived contextual information includes at least information relating to one or more available service; and a long range wireless transmitter configured to transmit said derived contextual information to at least one of a remote data collector and a remote service provider.

10. The device of claim 9, wherein said information relating to one or more available services includes information relating to one or more service capabilities of said at least one device.

11. The device of claim 9, wherein the processing unit is further configured to recover, from said detected short range wireless signals, information that conveys at least one of:

one or more usages of said at least one device;

a status of said at least one device; and one or more operations of said at least one device.

12. A device comprising:

a short range wireless receiver configured to detect short range wireless signals from at least one device, wherein said device comprises at least one of one or more context-determining devices and one or more subscriber units;

a processing unit configured to recover, from said detected short range wireless signals, information that conveys at least the presence of said at least one device, said processing unit further configured to derive contextual information from said recovered information, wherein said derived contextual information includes at least information relating to one or more available services;

a long range wireless transmitter configured to transmit said derived contextual information to a remote service provider; and wherein said device is operative to receive information relating to a service provided by said remote service provider.

13. A method comprising:

detecting, short range wireless signals from at least one device, wherein said device comprises one of one or more context-determining devices and one or more subscriber units;

recovering, from said detected short range wireless signals, information that conveys at least the presence of said at least one device; and deriving contextual information from said recovered information, wherein said derived contextual information includes at least information relating to one or more services capabilities of said at least one device.

14. The method of claim 13, wherein the method further includes forwarding said derived contextual information to at least one of a remote data collector and a remote service provider using a long range wireless transmitter.

15. The method of claim 13, wherein the method further includes receiving information relating to a service provided by said remote service provider.

16. The method of claim 13, wherein said step of recovering information further includes recovering at least one of:

one or more usages of said at least one device;

a status of said at least one device; and one or more operations of said at least one device;

prior to the step of deriving contextual information.

17. A device comprising:

a short range wireless receiver configured to detect short range wireless signals from at least one device, wherein said device comprises at least one of one or more context-determining devices and one or more subscriber units; and a processing unit configured to recover, from said detected short range wireless signals, information that conveys at least the presence of said at least one device, said processing unit further configured to derive contextual information from said recovered information, wherein said derived contextual information includes at least information relating to one or more service capabilities of said at least one device.

18. The device of claim 17, further including a long range wireless transmitter operatively configured to transmit said derived contextual information to at least one of a remote data collector and a remote service provider.

19. The device of claim 17, wherein said device is operative to receive information relating to a service provided by said remote service provider.

20. The device of claim 17, wherein the processing unit is further configured to recover, from said detected short range wireless signals, information that conveys at least one of:

one or more usages of said at least one device;

a status of said at least one device; and one or more operations of said at least one device.

* * * * *